United States Patent
Akiyama

(10) Patent No.: US 11,371,912 B2
(45) Date of Patent: Jun. 28, 2022

(54) MECHANICAL CHARACTERISTICS ESTIMATION METHOD AND MECHANICAL CHARACTERISTICS ESTIMATION DEVICE OF TEST SYSTEM

(71) Applicant: MEIDENSHA CORPORATION, Tokyo (JP)

(72) Inventor: Takao Akiyama, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 49 days.

(21) Appl. No.: 16/968,521

(22) PCT Filed: Nov. 26, 2018

(86) PCT No.: PCT/JP2018/043353
§ 371 (c)(1),
(2) Date: Aug. 7, 2020

(87) PCT Pub. No.: WO2019/155728
PCT Pub. Date: Aug. 15, 2019

(65) Prior Publication Data
US 2020/0408641 A1   Dec. 31, 2020

(30) Foreign Application Priority Data
Feb. 8, 2018  (JP) .............................. JP2018-020833

(51) Int. Cl.
*G01M 17/007* (2006.01)
*G01L 3/04* (2006.01)
*G01P 3/00* (2006.01)

(52) U.S. Cl.
CPC ............. *G01M 17/007* (2013.01); *G01L 3/04* (2013.01); *G01P 3/00* (2013.01)

(58) Field of Classification Search
CPC . G01M 13/026; G01M 13/025; G01L 15/221; G01L 3/04; B62D 5/046
See application file for complete search history.

(56) References Cited

U.S. PATENT DOCUMENTS 5,263,113 A * 11/1993 Naitoh ................... H02P 23/16
                                                      388/815
6,316,893 B1 * 11/2001 Rasimus ............. G05B 19/416
                                                      318/430

(Continued)

FOREIGN PATENT DOCUMENTS

JP           5561444 B2    7/2014
KR      20140125782 A    10/2014

(Continued)

*Primary Examiner* — Tran M. Tran
(74) *Attorney, Agent, or Firm* — Muncy, Geissler, Olds & Lowe, P.C.

(57) ABSTRACT

A drive train bench system has two dynamometers that are connected in series to a specimen. The mechanical characteristics estimation method has: a first measurement step for measuring a response to a first excitation torque input signal when the first excitation torque input signal overlaps a first torque current command signal while a measurement control circuit controls the two dynamometers; a second measurement step for measuring a response to a second excitation torque input signal when the second excitation torque input signal overlaps a second torque current command signal while the measurement control circuit controls the two dynamometers; and a mechanical characteristics transfer function estimation step for using the results from the first and second measurement steps to estimate a mechanical characteristics transfer function.

20 Claims, 13 Drawing Sheets

(56) References Cited

U.S. PATENT DOCUMENTS

| | | | |
|---|---|---|---|
| 6,696,812 B2* | 2/2004 | Kaneko | B60L 50/51 |
| | | | 318/700 |
| 6,768,940 B2* | 7/2004 | Akiyama | G01M 15/044 |
| | | | 701/114 |
| 6,775,610 B2* | 8/2004 | Akiyama | G01M 15/044 |
| | | | 701/110 |
| 7,523,011 B2* | 4/2009 | Akiyama | G06K 9/00516 |
| | | | 702/119 |
| 8,006,548 B2* | 8/2011 | Akiyama | G01M 15/02 |
| | | | 73/116.05 |
| 8,983,715 B2* | 3/2015 | Falkenstein | G01M 17/007 |
| | | | 701/32.8 |
| 9,116,062 B2* | 8/2015 | Akiyama | G01L 3/24 |
| 9,207,149 B2* | 12/2015 | Kanke | G01M 13/025 |
| 9,234,820 B2* | 1/2016 | Akiyama | G01M 15/00 |
| 9,459,181 B2* | 10/2016 | Akiyama | G01M 17/007 |
| 9,689,774 B2* | 6/2017 | Kanke | G01M 13/025 |
| 9,739,687 B2* | 8/2017 | Akiyama | G01M 15/05 |
| 10,451,522 B2* | 10/2019 | Sugita | G01S 17/58 |
| 2015/0013443 A1 | 1/2015 | Kanke | |
| 2016/0109328 A1* | 4/2016 | Kanke | G01M 15/044 |
| | | | 73/865.6 |
| 2016/0327451 A1* | 11/2016 | Bauer | G01M 13/025 |
| 2019/0017894 A1 | 1/2019 | Akiyama | |
| 2019/0219481 A1* | 7/2019 | Akiyama | H02P 6/08 |

FOREIGN PATENT DOCUMENTS

| | | |
|---|---|---|
| WO | WO-2013/105375 A1 | 7/2013 |
| WO | WO-2017/119243 A1 | 7/2017 |
| WO | WO-2018/164266 A1 | 9/2018 |

* cited by examiner

Pw11

Pw12

US 11,371,912 B2

MECHANICAL CHARACTERISTICS ESTIMATION METHOD AND MECHANICAL CHARACTERISTICS ESTIMATION DEVICE OF TEST SYSTEM

TECHNICAL FIELD

The present invention relates to a mechanical characteristics estimation method and a mechanical characteristics estimation device of a test system. In more detail, it relates to a mechanical characteristics estimation method and a mechanical characteristics estimation device which estimate the mechanical characteristics of a test system including two electric motors coupled in series to a test piece.

BACKGROUND ART

Patent Document 1 shows a test system which includes a so-called tandem dynamometer coupling two dynamometers in series to a test piece which is a drive train of a vehicle. Although such a tandem dynamometer must generate a large drive torque, for example, it has advantages in a case of being difficult to increase the size of the dynamometer due to restrictions in layout caused by the shape, etc. of the test piece.

In addition, with the test system using a dynamometer, there is concern over resonance occurring due to shaft twist. Therefore, Patent Document 1 shows a resonance suppression circuit and design method thereof to control each dynamometer so that resonance is suppressed, in a test system having a tandem dynamometer. More specifically, the design method of Patent Document 1 regards the test system having a tandem dynamometer as a so-called 3-inertial system configured by coupling three inertial bodies by two spring elements, and designs a resonance suppression circuit having high resonance suppression effect by applying a control-system design method called H∞ control or μ synthesis to a generalized plant in which this three-inertia model is combined.

Patent Document 1: Japanese Patent No. 5556144

DISCLOSURE OF THE INVENTION

Problems to be Solved by the Invention

In the invention of Patent Document 1, in order to create a three-inertia model incorporated into the generalized plant, it is necessary to specify the values of mechanical characteristic parameters such as the moment of inertia and spring stiffness of each dynamometer and the test piece; however, the values of these mechanical characteristics parameters are specified by analysis based on the mechanical characteristic transfer functions measured in the actual test system. Therefore, in order to design a resonance suppression circuit, it is necessary to measure the mechanical characteristics transfer function of the test system.

However, the mechanical characteristics transfer function is generally measured by acquiring the response obtained when exciting the input to a dynamometer, in a state in which any control (for example, speed control) of the dynamometer is being executed by a control device. However, with the test system including tandem dynamometers, the one which is not excitation controlled among the two dynamometers is under the control of the control device. For this reason, the control circuit characteristics of the control device are reflected in the mechanical characteristics transfer function measured by a conventional method, and it is not possible to measure the true mechanical properties.

The present invention has an object of providing, in a test system including a tandem dynamometer, a mechanical characteristics estimation method and a mechanical characteristics estimation device which can estimate the true mechanical characteristics not including control circuit characteristics of a control device.

Means for Solving the Problems

According to a first aspect of the present invention, a test system (for example, the test piece W described later) that includes: a first electric motor (for example, the first dynamometer 21 described later) having a first drive shaft (for example, the first drive shaft 21a described later) coupled coaxially with an input shaft (for example, the input shaft W1 described later) of a test piece, and causing the first drive shaft to rotate in response to a first input; a second electric motor (for example, the second dynamometer 22 described later) having a second drive shaft (for example, the second drive shaft 22a described later) coupled coaxially with the first drive shaft and causing the second drive shaft to rotate in response to a second input; a shaft torque sensor (for example, the shaft torque sensor 3 described later) which couples the input shaft and the first drive shaft and generates a shaft torque detection signal according to shaft torque; a first speed detector (for example, the first rotation speed detector 41 described later) which generates a first speed detection signal according to a rotation speed of the first drive shaft; a second speed detector (for example, the second rotation speed detector 42 described later) which generates a second speed detection signal according to a rotation speed of the second drive shaft; and a control device (for example, the measurement control circuit 55 described later) which generates the first input and the second input based on the first speed detection signal and the second speed detection signal. A mechanical characteristic estimation method according to the present invention is a method for estimating mechanical characteristics of such a test system (for example, the mechanical characteristic transfer functions, mechanical characteristic parameters, etc. described later) includes: a first measurement step of measuring a response to a first excitation signal when superimposing the first excitation signal on the first input, in a state in which the first electric motor and the second electric motor are controlled by the control device (for example, the Step S2 in FIG. 3 described later); a second measurement step of measuring a response to a second excitation signal when superimposing the second excitation signal on the second input, in a state in which the first electric motor and the second electric motor are controlled by the control device (for example, the Step S3 in FIG. 3 described later); and a mechanical characteristic estimation step of estimating the mechanical characteristic using results of the first measurement step and the second measurement step (for example, the Step S4 in FIG. 3 described later).

According to a second aspect of the present invention, in this case, it is preferable for the mechanical characteristic estimation step to estimate at least any of a transfer function of the shaft torque detection signal relative to the first input (for example, the mechanical characteristic transfer function Pt1 described later); a transfer function of the shaft torque detection signal relative to the second input (for example, the mechanical characteristic transfer function Pt2 described later); a transfer function of the first speed detection signal relative to the first input (for example, the mechanical characteristic transfer function Pw11 described later); a transfer function of the first speed detection signal relative to the second input (for example, the mechanical characteristic transfer function Pw12 described later); a transfer function of the second detection signal relative to the first input (for example, the mechanical characteristic transfer function Pw21 described later); and a transfer function of the second speed detection signal relative to the second input (for example, the mechanical characteristic transfer function Pw22 described later).

According to a third aspect of the present invention, in this case, it is preferable for the first measurement step to measure a transfer function of the shaft torque detection signal relative to the first excitation signal (for example, the transfer function Gtd1 described later); a transfer function of the first speed detection signal relative to the first excitation signal (for example, the transfer function Gw1d1 described later); a transfer function of the second speed detection signal relative to the first excitation signal (for example, the transfer function Gw2d1 described later); a transfer function of the first input relative to the first excitation signal (for example, the transfer function Gi1d1 described later); and a transfer function of the second input relative to the first excitation signal (for example, the transfer function Gi2d1 described later).

According to a fourth aspect of the present invention, in this case, it is preferable for the second measurement step to measure a transfer function of the shaft torque detection signal relative to the second excitation signal (for example, the transfer function Gtd2 described later); a transfer function of the first speed detection signal relative to the second excitation signal (for example, the transfer function Gw1d2 described later); a transfer function of the second speed detection signal relative to the second excitation signal (for example, the transfer function Gw2d2 described later); a transfer function of the first input relative to the second excitation signal (for example, the transfer function Gi1d2 described later); and a transfer function of the second input relative to the second excitation signal (for example, the transfer function Gi2d2 described later).

According to a fifth aspect of the present invention, in this case, it is preferable for the mechanical characteristics estimation method to further include: a control circuit characteristic estimation step of estimating a control circuit characteristic of the control device using results of the first measurement step and the second measurement step (for example, the Step S5 in FIG. 3 described later).

According to a sixth aspect of the present invention, in this case, it is preferable for the control circuit characteristic estimation step to estimate at least any of a transfer function of the first input relative to the first speed detection signal (for example, the control circuit transfer function K11 described later); a transfer function of the first input relative to the second speed detection signal (for example, the control circuit transfer function K12 described later); a transfer function of the second input relative to the first speed detection signal (for example, the control circuit transfer function K21 described later); a transfer function of the second input relative to the first speed detection signal; and a transfer function of the second input relative to the second speed detection signal (for example, the control circuit transfer function K22 described later).

A mechanical characteristics estimation method (for example, the arithmetic unit 9 described later) for a test system according to a seventh aspect of the present invention includes: a first measurement means (for example, the arithmetic unit 9 described later) for measuring a response to a first excitation signal when superimposing the first excitation signal on the first input, in a state in which the first electric motor and the second electric motor are controlled by the control device; a second measurement means (for example, the arithmetic unit 9 described later) for measuring a response to a second excitation signal when superimposing the second excitation signal on the second input, in a state in which the first electric motor and the second electric motor are controlled by the control device; and a mechanical characteristics estimation means (for example, the arithmetic unit 9 described later) for estimating the mechanical characteristics using results measured by the first measurement means and the second measurement means.

Effects of the Invention

In the first aspect of the present invention, in a state in which the first and second electric motors coupled in series are being controlled by the control device, the response to the first excitation signal is measured when superimposing the first excitation signal on the first input to the first electric motor, and further the response to the second excitation signal is measured when superimposing the second excitation signal on the second input to the second electric motor. In addition, in the present invention, the mechanical characteristics are measured using the results measured in the first and second measurement steps in this way. In the present invention, it is possible to estimate the true mechanical characteristics not including the control circuit characteristics of the control device, by estimating the mechanical characteristics through measurement of the response to the first excitation signal and the response to the second excitation signal under the control of the control device.

In the second aspect of the present invention, using the results measured in the first and second measurement steps, at least any of a transfer function of the shaft torque detection signal relative to the first input, a transfer function of the shaft torque detection signal relative to the second input, a transfer function of the first speed detection signal relative to the first input, a transfer function of the first speed detection signal relative to the second input, a transfer function of the second speed detection signal relative to the first input, and a transfer function of the second speed detection signal relative to the second input is measured. It is thereby possible to estimate a true mechanical characteristic not including the control circuit characteristics of the control device becomes necessary upon designing a resonance suppression circuit based on H∞ control or μ synthesis.

In the first measurement step in the third aspect of the present invention estimates a transfer function of the shaft torque detection signal relative to the first excitation signal, a transfer function of the first speed detection signal relative to the first excitation signal, a transfer function of the second speed detection signal relative to the first excitation signal, a transfer function of the first input relative to the first excitation signal, and a transfer function of the second input relative to the first excitation signal. The first measurement step can thereby measure transfer functions which are necessary upon estimating the true mechanical characteristics not including control circuit characteristics of the control device, in the mechanical characteristic estimation step.

The second measurement step in the fourth aspect of the present invention measures a transfer function of the shaft torque detection signal relative to the second excitation signal, a transfer function of the first speed detection signal relative to the second excitation signal, a transfer function of the second speed detection signal relative to the second excitation signal, a transfer function of the first input relative to the second excitation signal, and a transfer function of the second input relative to the second excitation signal. The second measurement step can thereby measure transfer functions which are necessary upon estimating the true mechanical characteristics not including control circuit characteristics of the control device, in the mechanical characteristic estimation step.

In the fifth aspect of the present invention, the control circuit characteristics of the control device are estimated using the results of the first and second measurement steps. It is thereby possible to retrieve only the control device form the test system, and estimate the control circuit characteristics of the control device without performing identity testing separately from estimation of the above-mentioned mechanical characteristics.

The control circuit characteristic estimation step of the sixth aspect of the present invention estimates at least any of a transfer function of the first input relative to the first speed detection signal, a transfer function of the first input relative to the second speed detection signal, a transfer function of the second input relative to the first speed detection signal, a transfer function of the second input relative to the first speed detection signal, and a transfer function of the second input relative to the second speed detection signal. It is thereby possible to retrieve only the control device form the test system, and estimate the control circuit characteristics of the control device without performing identity testing separately from estimation of the above-mentioned mechanical characteristics.

According to the mechanical characteristics estimation device of the seventh aspect of the present invention, it is possible to estimate the true mechanical characteristics not including the control circuit characteristics of the control device, similarly to the first aspect of the present invention.

PREFERRED MODE FOR CARRYING OUT THE INVENTION

Figure 1:
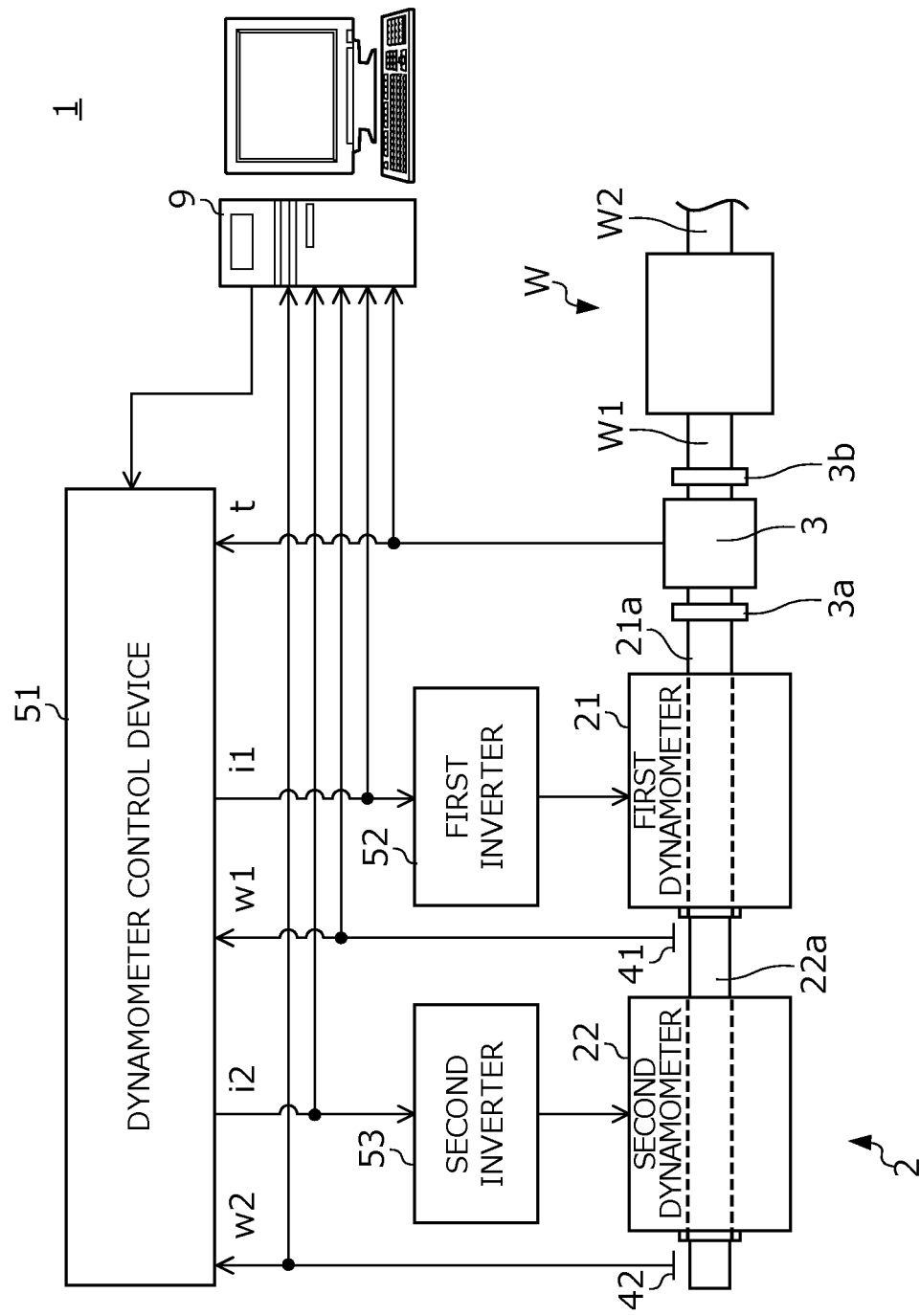
FIG. 1 is a view showing the configuration of a drive train bench system to which a mechanical characteristics estimation method and a mechanical characteristics estimation device according to an embodiment of the present invention are applied.

Hereinafter, an embodiment of the present invention will be explained in detail while referencing the drawings. FIG. 1 is a view showing the configuration of a drive train bench system 1 to which a mechanical characteristics estimation method and a mechanical characteristics estimation device according to the present embodiment are applied.

The drive train bench system 1 is a test system establishing the drive train for a vehicle as a test piece W, and related to a drive train to be used upon evaluating various performances of this test piece W. Herein, drive train refers to a generic term of a power transmission device that transfers the drive power generated by a vehicle power generation source such as an engine or motor, and includes an input shaft coupled to the power generation source side in a state mounted to the vehicle, and an output shaft coupled to the drive wheel side.

The drive train bench system 1 includes: a tandem dynamometer unit 2 configured by combining two dynamometers 21, 22; a test piece W which transfers the power inputted to an input shaft W1 to an output shaft W2; a shaft torque sensor 3; two rotation speed detectors 41, 42; a dynamometer control device 51 which generates a torque current command signal for controlling the dynamometer unit 2 based on the detection signal sent from the shaft torque sensor 3 and rotation speed detectors 41, 42; two inverters 52, 53 which supply electric power to each dynamometer 21, 22 in response to the torque current command signal sent from the dynamometer control device 51; and an arithmetic unit 9 which performs various computations for estimating the mechanical characteristics of the drive train bench system 1. It should be noted that FIG. 1 omits illustration of the configuration of a power absorber which is coupled to the output shaft W2 of the test piece W, and absorbs the power generated by this output shaft W2.

The dynamometer unit 2 is configured by coupling a first drive shaft 21a of a first dynamometer 21 and a second driver shaft 22a of a second dynamometer 22 coaxially. A leading end side of the first drive shaft 21a of the first dynamometer 21 is coupled to the input shaft W1 of the test piece W coaxially via the shaft torque sensor 3. The leading end side of the second drive shaft 22a of the second dynamometer 22 is coupled with a base end side of the first drive shaft 21a via a coupling member that is not illustrated. The first dynamometer 21, when electric power is supplied from the first inverter 53, causes the first drive shaft 21a thereof to rotate. In addition, the second dynamometer 22, when electric power is supplied from the second inverter 53, causes the second drive shaft 22a thereof to rotate.

The shaft torque sensor 3 has one end side thereof coupled to the first drive shaft 21a of the first dynamometer 21 via a first coupling 3a, and another end side thereof coupled to the input shaft W1 of the test piece W via a second coupling 3b. The second dynamometer 22, first dynamometer 21, shaft torque sensor 3 and test piece W are thereby coupled coaxially. The shaft torque sensor 3 generates a shaft torque detection signal according to torsional torque (hereinafter referred to as "shaft torque") generating between the input shaft W1 and first drive shaft 21a, and sends this to the dynamometer control device 51 and arithmetic unit 9. Hereinafter, the value of the shaft torque detection signal, i.e. shaft torque detection value, is denoted as "t".

The first rotation speed detector 41 is an encoder, for example, and generates a first rotation speed detection signal, which is a pulse signal according to the rotation speed of the first drive shaft 21a of the first dynamometer 21, and sends this signal to the dynamometer control device 51 and arithmetic unit 9. Hereinafter, the value of the first rotation speed detection signal, i.e. first rotation speed detection value, is denoted as "w1".

The second rotation speed detector 42 is an encoder, for example, and generates a second rotation speed detection signal which is a pulse signal according to the rotation speed of the second drive shaft 22a of the second dynamometer, and sends this signal to the dynamometer control device 51 and arithmetic unit 9. Hereinafter, the value of the second rotation speed detection signal, i.e. second rotation speed detection value, is denoted as "w2".

The dynamometer control device 51 generates a first torque current command signal for controlling the first dynamometer 21 and a second torque current command signal for controlling the second dynamometer 22, by employing the shaft torque detection signal sent from the shaft torque sensor 3, first rotation speed detection signal sent from the first rotation speed detector 41, and the second rotation speed detection signal sent from the second rotation speed detector 42, and sends these first and second torque current command signals to the first and second inverters 52, 53, respectively. Hereinafter, the value of the first torque command signal, i.e. first torque current command value, is denoted as "i1", and the value of the second torque current command signal, i.e. second torque current command value, is denoted as "i2".

The arithmetic unit 9 is a computer, and estimates the mechanical characteristics of the drive train bench system 1, by performing computation according to the sequence explained by referencing FIG. 3 later, using the first and second torque current command signals inputted to the first and second inverters 52, 53 from the dynamometer control device 51; and the first and second rotation speed detection signals obtained by the first and second rotation speed detectors 41, 42 together with the shaft torque detection signal obtained by the shaft torque sensor 3 by inputting these first and second torque current command signals. Herein, mechanical characteristics more specifically refer to the mechanical characteristic transfer function between input/output of the drive train bench system 1, various mechanical characteristic parameters which characterize the mechanical model of the drive train bench system 1, etc. It should be noted that the estimation results of the mechanical characteristics obtained by the arithmetic unit 9 can be used in the design of a resonance suppression control circuit built into the dynamometer control device 51, for example. In addition, the specific design sequence of the resonance suppression control circuit to be used in the drive train bench system 1 equipped with the tandem dynamometer unit as in the present embodiment 2 has been described in Japanese Patent No. 5,561,444 by the applicants of the present disclosure, for example, and thus a detailed explanation thereof is omitted herein. Hereinafter, the sequence of estimating the mechanical characteristics of the drive train bench system 1 in the arithmetic unit 9 will be explained.

Figure 2:
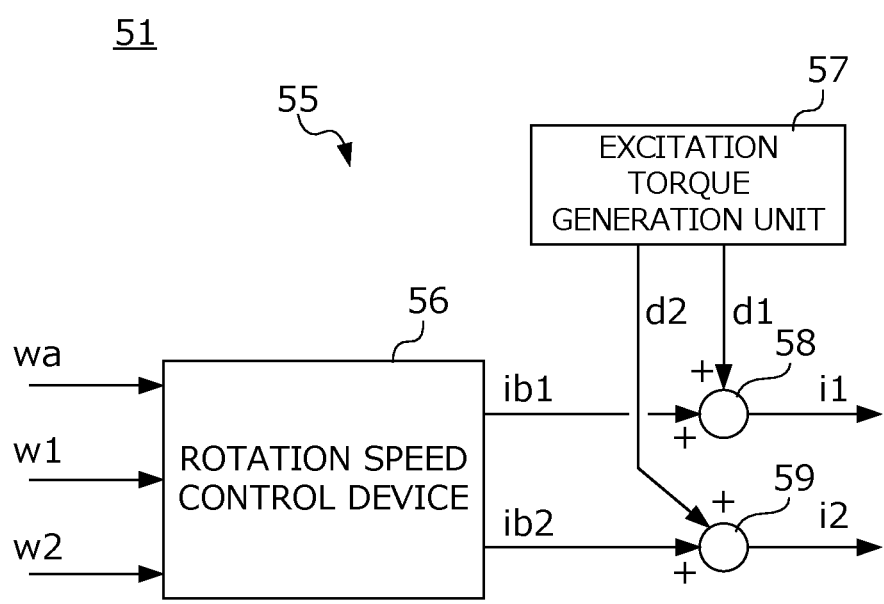
FIG. 2 is a view showing the configuration of a measurement control circuit to be used upon estimating mechanical characteristics by an arithmetic unit.

FIG. 2 is a view showing the configuration of a measurement control circuit 55 which is a control circuit built into the dynamometer control device 51, and to be used upon estimating the mechanical characteristics of the drive train bench system 1 by the arithmetic unit 9.

The measurement control circuit 55 includes a rotation speed control circuit 56, excitation torque generation part 57, first command generation part 58 and second command generation part 59, and generates the first and second torque current command signals upon estimating the mechanical characteristics using these.

The rotation speed control circuit 56, using the first rotation speed detection signal (w1), second rotation speed detection signal (w2), and rotation speed command signals relative to these detection signals (w1, w2), generates a first base torque input signal and second base torque input signal according to a known feedback algorithm, so that the speed detection values w1, w2 both become values according to a predetermined rotation speed command signal. Hereinafter, the value of the first base torque input signal is denoted as "ib1", and the value of the second base torque input signal is denoted as "ib2". In addition, upon estimating the mechanical characteristics in the arithmetic unit 9, the value wa of the rotation speed command signal is maintained constant at a predetermined value decided for testing.

The excitation torque generation unit 57 generates a first excitation torque input signal and second excitation torque input signal which change randomly under a predetermined excitation frequency within a predetermined range centered around 0, in response to a request from the arithmetic unit 9. Hereinafter, the value of the first excitation torque input signal is denoted as "d1", and the value of the second excitation torque input signal is denoted as "d2".

The first command generation part 58, in the case of the first excitation torque input signal not being generated (case of d1=0), outputs a first base torque input signal as a first torque current command signal as is (i1=ib1). The first command generation unit 58, in the case of the first excitation torque input signal being generated (case of d1≠0), outputs a value arrived at by superimposing the first excitation torque input signal on the first base torque input signal as the first torque current command signal (i1=ib1+d1).

The second command generation unit 59, in the case of the second excitation torque input signal not being generated (case of d2=0), outputs the second base torque input signal as a second torque current command signal as is (i2=ib2). The second command generation unit 59, in the case of the second excitation torque input signal being generated (case of d2≠0), outputs a value arrived at by superimposing the second excitation torque input signal on the second base torque input signal as the second torque current command signal (i2=ib2+d2).

Upon estimating the mechanical characteristics of the drive train bench system 1 by computation in the arithmetic unit 9, although the speed control of the first and second dynamometers 21, 22 using the first and second rotation speed detection signals is not performed using the aforementioned such measurement control circuit 55, excitation control is performed by superimposing the first and second excitation torque input signals as appropriate.

The drive train bench system 1 including the tandem dynamometer unit 2 in the aforementioned way includes two inputs (first and second torque current command signals) and three outputs (shaft torque detection signal, as well as first and second rotation speed detection signals). Consequently, the mechanical characteristics of the drive train bench system 1 are expressed by six transfer functions (Pt1, Pt2, Pw11, Pw12, Pw21, Pw22), as shown by Formulas (1-1) to (1-6) below. As shown by the formulas below, the transfer function Pt1 is a mechanical characteristic transfer function of the shaft torque detection signal relative to the first torque current command signal; the transfer function Pt2 is a mechanical characteristic transfer function of the shaft torque detection signal relative to the second torque current command signal; the transfer function Pw11 is a mechanical characteristic transfer function of the first rotation speed detection signal relative to the first torque current command signal; the transfer function Pw12 is a mechanical characteristic transfer function of the first rotation speed detection signal relative to the second torque current command signal; the transfer function Pw21 is a mechanical characteristic transfer function of the second rotation speed detection signal relative to the first torque current command signal; and the transfer function Pw22 is a mechanical characteristic transfer function of the second rotation speed detection signal relative to the second torque current command signal.

$$Pt1 = t/i1 \tag{1-1}$$

$$Pt2 = t/i2 \tag{1-2}$$

$$Pw11 = w1/i1 \tag{1-3}$$

$$Pw12 = w1/i2 \tag{1-4}$$

$$Pw21 = w2/i1 \tag{1-5}$$

$$Pw22 = w2/i2 \tag{1-6}$$

In addition, when using the above such six mechanical characteristic transfer functions (Pt1, Pt2, Pw11, Pw12, Pw21, Pw22), the equation of motion of the dynamometer unit 2 is expressed by Formulas (2-1) to (2-3) below.

$$t = Pt1 \cdot i1 + Pt2 \cdot i2 \tag{2-1}$$

$$w1 = Pw11 \cdot i1 + Pw12 \cdot i2 \tag{2-2}$$

$$w2 = Pw21 \cdot i1 + Pw22 \cdot i2 \tag{2-3}$$

In addition, in the measurement control circuit 55 shown in FIG. 5, the control circuit characteristics of the rotation speed control circuit 56 are expressed by four transfer functions (K11, K12, K21, K22) as shown in Formulas (3-1) to (3-4) below. As shown by the below formulas, the transfer function K11 is a control circuit transfer function of the first base torque input signal relative to the first rotation speed detection signal of the rotation speed control circuit 56; the transfer function K12 is a control circuit transfer function of the first base torque input signal relative to the second rotation speed detection signal in the rotation speed control circuit 56; the transfer function K21 is a control circuit transfer function of the first rotation speed detection signal in the rotation speed control circuit 56; and the transfer function K22 is a control circuit transfer function of the second base torque input signal relative to the second rotation speed detection signal in the rotation speed control circuit 56.

$$K11 = ib1/w1 \tag{3-1}$$

$$K12 = ib1/w2 \tag{3-2}$$

$$K21 = ib2/w1 \tag{3-3}$$

$$K22 = ib2/w2 \tag{3-4}$$

In addition, when using the above such control circuit transfer functions (K11, K12, K21, K22), the arithmetic expression of the measurement control circuit 55 is expressed by Formulas (4-1) and (4-2) below. It should be noted that, upon estimating mechanical characteristics in the arithmetic unit 9, in order to measure the frequency characteristic during excitation using the first and second excitation torque input signals, the rotation speed command signal maintained at a constant value can be ignored in Formulas (4-1) and (4-2) below.

$$i1 = K11 \cdot w1 + K12 \cdot w2 + d1 \tag{4-1}$$

$$i2 = K21 \cdot w1 + K22 \cdot w2 + d2 \tag{4-2}$$

Herein, a method will be explained of estimating the six mechanical characteristic transfer functions (Pt1, Pt2, Pw11, Pw12, Pw21, Pw22) and four control circuit transfer functions (K11, K12, K21, K22) in the arithmetic unit 9, by using the frequency characteristic from the first excitation input signal (d1) to the measurement signal (t, w1, w2, i2) in the case of turning OFF the second excitation torque input signal and superimposing only the first excitation torque input signal, and the frequency characteristic from the second excitation torque input signal (d2) to the measurement signal (t, w1, w2, i1, i2) in the case of turning OFF the first excitation torque input signal and superimposing only the second excitation torque input signal.

The first measurement means configured by the arithmetic unit 9 measures the five transfer functions (Gtd1, Gw1d1, Gw2d1, Gi1d1, Gi2d1) expressed by Formulas (5-1) to (5-5) below, by turning OFF the second excitation input signal (d2=0) and superimposing only the first excitation torque input signal, in a state in which the first and second dynamometers 21, 22 are being controlled by the measurement control circuit 55. The transfer function Gtd1 is a transfer function of the shaft torque detection signal relative to the first excitation torque input signal; the transfer function Gw1d1 is a transfer function of the first rotation speed detection signal relative to the first excitation torque input signal; the transfer function Gw2d1 is a transfer function of the second rotation speed detection signal relative to the first excitation torque input signal; the transfer function Gi1d1 is a transfer function of the first rotation speed detection signal relative to the first excitation torque input signal; and the transfer function Gi2d1 is a transfer function of the second rotation speed detection signal relative to the first excitation torque input signal.

$$Gtd1 = t/d1 \tag{5-1}$$

$$Gw1d1 = w1/d1 \tag{5-2}$$

$$Gw2d1 = w2/d1 \tag{5-3}$$

$$Gi1d1 = i1/d1 \tag{5-4}$$

$$Gi2d1 = i2/d1 \tag{5-5}$$

The second measurement means configured by the arithmetic unit 9 measures the five transfer functions (Gtd2, Gw1d2, Gw2d2, Gi1d2, Gi2d2) expressed by Formulas (6-1) to (6-5) below, by turning OFF the first excitation input signal (d1=0) and superimposing only the second excitation torque input signal, in a state in which the first and second dynamometers 21, 22 are being controlled by the measurement control circuit 55. The transfer function Gtd2 is a transfer function of the shaft torque detection signal relative to the second excitation torque input signal; the transfer function Gw1d2 is a transfer function of the first rotation speed detection signal relative to the second excitation torque input signal; the transfer function Gw2d2 is a transfer function of the second rotation speed detection signal relative to the second excitation torque input signal; the transfer function Gi1d2 is a transfer function of the first rotation speed detection signal relative to the second excitation torque input signal; and the transfer function Gi2d2 is a transfer function of the second rotation speed detection signal relative to the second excitation torque input signal.

$$Gtd2 = t/d2 \quad (6\text{-}1)$$

$$Gw1d2 = w1/d2 \quad (6\text{-}2)$$

$$Gw2d2 = w2/d2 \quad (6\text{-}3)$$

$$Gi1d2 = i1/d2 \quad (6\text{-}4)$$

$$Gi2d2 = i2/d2 \quad (6\text{-}5)$$

Herein, by overwriting the above Formulas (2-1) to (2-3) and the above Formulas (4-1) and (4-2) using the transfer functions expressed by the above Formulas (5-1) to (5-5) and the above Formulas (6-1) to (6-5), the following Formulas (7-1) to (7-10) are derived relative to the six mechanical characteristic transfer functions (Pt1, Pt2, Pw11, Pw12, Pw21, Pw22) and the four control circuit transfer functions (K11, K12, K21, K22).

$$Pt1 = \frac{Gtd2 \cdot Gi2d1 - Gtd1 \cdot Gi2d2}{Gi1d2 \cdot Gi2d1 - Gi1d1 \cdot Gi2d2} \quad (7\text{-}1)$$

$$Pt2 = \frac{Gtd2 \cdot Gi1d1 - Gtd1 \cdot Gi1d2}{-Gi1d2 \cdot Gi2d1 + Gi1d1 \cdot Gi2d2} \quad (7\text{-}2)$$

$$Pw11 = \frac{-Gi2d2 \cdot Gw1d1 + Gi2d1 \cdot Gw1d2}{Gi1d2 \cdot Gi2d1 - Gi1d1 \cdot Gi2d2} \quad (7\text{-}3)$$

$$Pw12 = \frac{Gi1d2 \cdot Gw1d1 - Gi1d1 \cdot Gw1d2}{Gi1d2 \cdot Gi2d1 - Gi1d1 \cdot Gi2d2} \quad (7\text{-}4)$$

$$Pw21 = \frac{-Gi2d2 \cdot Gw2d1 + Gi2d1 \cdot Gw2d2}{Gi1d2 \cdot Gi2d1 - Gi1d1 \cdot Gi2d2} \quad (7\text{-}5)$$

$$Pw22 = \frac{Gi1d2 \cdot Gw2d1 - Gi1d1 \cdot Gw2d2}{Gi1d2 \cdot Gi2d1 - Gi1d1 \cdot Gi2d2} \quad (7\text{-}6)$$

$$K11 = \frac{Gi1d2 \cdot Gw2d1 + Gw2d2 - Gi1d1 \cdot Gw2d2}{Gw1d2 \cdot Gw2d1 - Gw1d1 \cdot Gw2d2} \quad (7\text{-}7)$$

$$K12 = \frac{Gi1d2 \cdot Gw1d1 + Gw1d2 - Gi1d1 \cdot Gw1d2}{-Gw1d2 \cdot Gw2d1 + Gw1d1 \cdot Gw2d2} \quad (7\text{-}8)$$

$$K21 = \frac{-Gw2d1 + Gi2d2 \cdot Gw2d1 - Gi2d1 \cdot Gw2d2}{Gw1d2 \cdot Gw2d1 - Gw1d1 \cdot Gw2d2} \quad (7\text{-}9)$$

$$K22 = \frac{-Gw1d1 + Gi2d2 \cdot Gw1d1 - Gi2d1 \cdot Gw1d2}{-Gw1d2 \cdot Gw2d1 + Gw1d1 \cdot Gw2d2} \quad (7\text{-}10)$$

The mechanical characteristic estimation means configured by the arithmetic unit 9 estimates the six mechanical characteristic transfer functions (Pt1, Pt2, Pw11, Pw12, Pw21, Pw22) and the four control circuit transfer functions (K11, K12, K21, K22), by inputting into the above Formulas (7-1) to (7-10) the measurement results of the total of 10 transfer functions (Gtd1, Gw1d1, Gw2d1, Gi1d1, Gi2d1, Gtd2, Gw1d2, Gw2d2, Gi1d2, Gi2d2) measured by the first and second measurement means in the aforementioned way.

Figure 3:
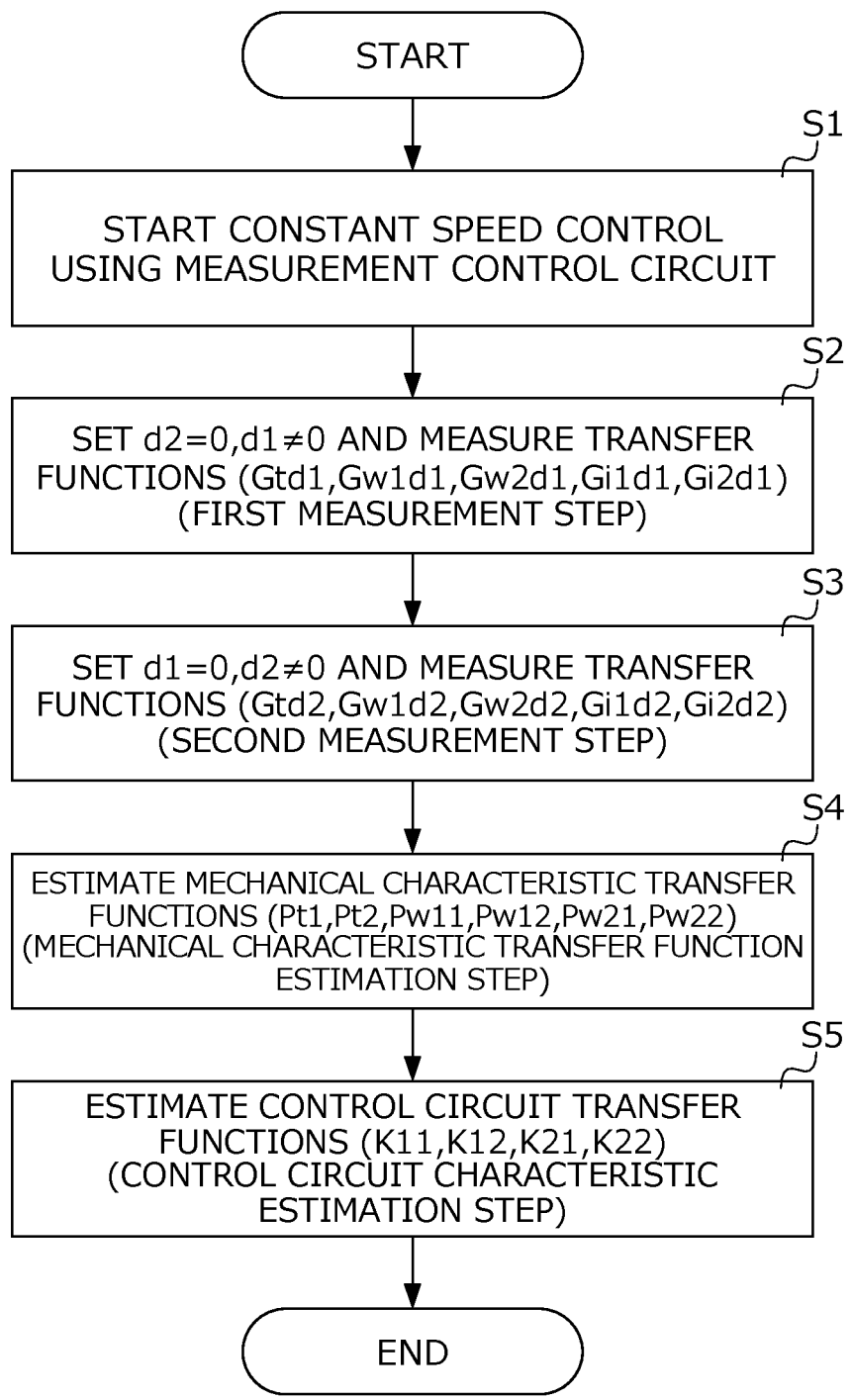
FIG. 3 is a flowchart showing a sequence of estimating the mechanical characteristics of a drive train bench system in an arithmetic unit.

FIG. 3 is a flowchart showing the sequence of estimating the mechanical characteristics of the drive train bench system 1 in the arithmetic unit 9.

First, in Step S1, the arithmetic unit 9 starts constant speed control which estimates the rotation speed of the first dynamometer 21 and second dynamometer 22 at a constant speed, using the measurement control circuit 55. It should be noted that, in this constant speed control, the rotation speed command value wa is maintained constantly at a predetermined value decided for testing, and the values of the first excitation torque input signal and the second excitation torque input signal are set as 0.

Next, in a first measurement step of Step S2, the arithmetic unit 9 excites only the first excitation torque input signal while maintaining the value of the second excitation torque input signal at 0, in a state in which the above-mentioned constant speed control is continued, and measures various responses to the first excitation torque input signal when superimposing this first excitation torque input signal on the first torque current command signal, more specifically, the five transfer functions (Gtd1, Gw1d1, Gw2d1, Gi1d1, Gi2d1) explained by referencing the above Formulas (5-1) to (5-5). In addition, when measurement of these five transfer functions finishes, the arithmetic unit 9 sets the value of the first excitation torque input signal to 0, and ends excitation control on the first dynamometer 21.

Next, in the second measurement step of Step S3, the arithmetic unit 9 excites only the second excitation torque input signal, while maintaining the value of the first excitation torque input signal at 0, in a state in which the above-mentioned constant speed control is being continued, and measures various responses on the second excitation torque input signal when superimposing this second excitation torque input signal on the second torque current command signal, more specifically, the five transfer functions (Gtd2, Gw1d2, Gw2d2, Gi1d2, Gi2d2) explained by referencing the above Formulas (6-1) to (6-5). In addition, when measurement of these five transfer functions finishes, the arithmetic unit 9 ends the excitation control on the second dynamometer 22, and constant speed control using the measurement control circuit 55.

Next, in the mechanical characteristic transfer function estimation step of Step S4, the arithmetic unit 9 estimates the six mechanical characteristic transfer functions (Pt1, Pt2, Pw11, Pw12, Pw21, Pw22) by inputting into the above Formulas (7-1) to (7-6) the five transfer functions (Gtd1, Gw1d1, Gw2d1, Gi1d1, Gi2d1) measured in the first measurement step, and the five transfer functions (Gtd2, Gw1d, Gw2d2, Gi1d2, Gi2d2) measured in the second measurement step.

Next, in the control circuit characteristic estimation step of Step S5, the arithmetic unit 9 estimates the four control circuit transfer functions (K11, K12, K21, K22), by inputting to the above Formulas (7-7) to (7-10) the five transfer functions (Gtd1, Gw1d1, Gw2d1, Gi1d1, Gi2d1) measured in the first measurement step, and the five transfer functions (Gtd2, Gw1d2, Gw2d2, Gi1d2, Gi2d2) measured in the second measurement step.

Hereinafter, the effects of the mechanical characteristics estimation method and mechanical characteristics estimation device according to the present embodiment will be explained while referencing the effects by simulation.

Figure 4A:
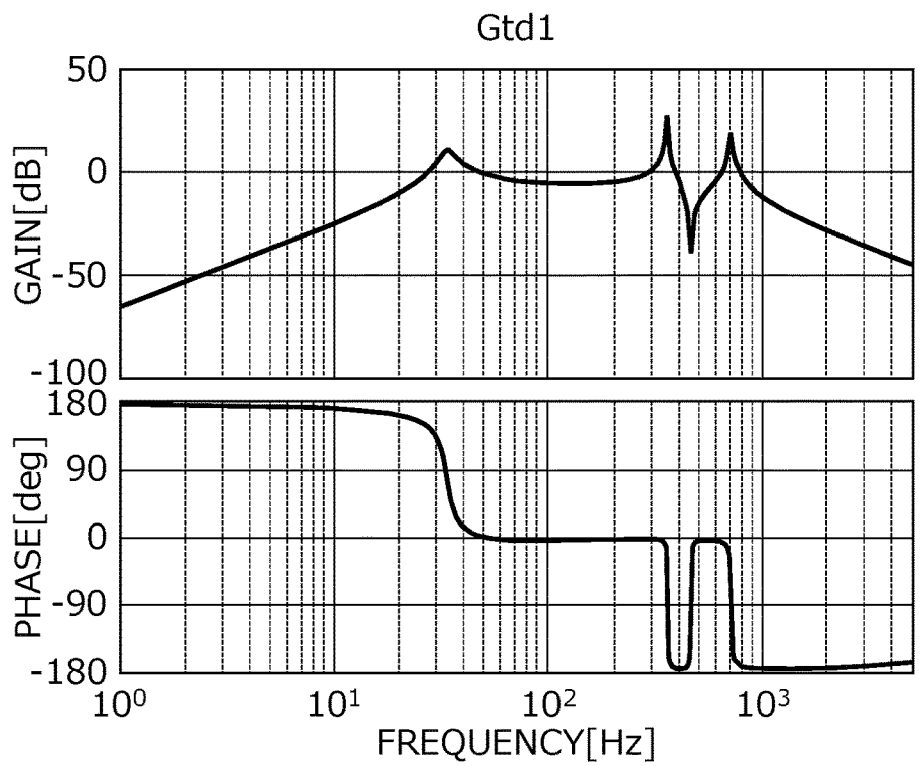
FIG. 4A is a Bode diagram of a transfer function Gtd1.
Figure 4B:
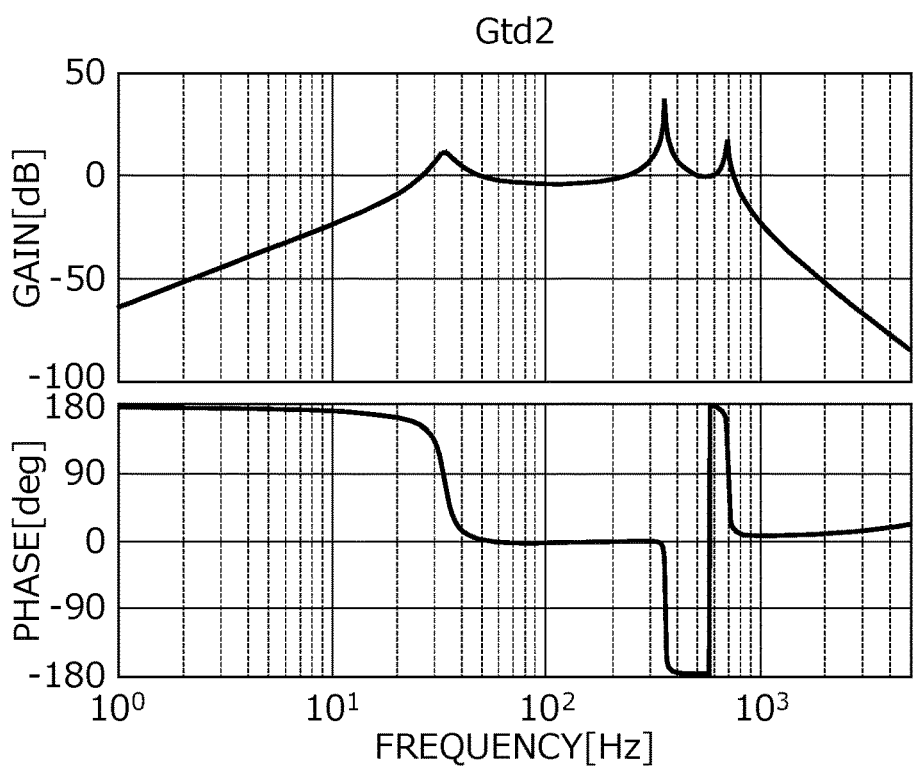
FIG. 4B is a Bode diagram of a transfer function Gtd2.
Figure 4C:
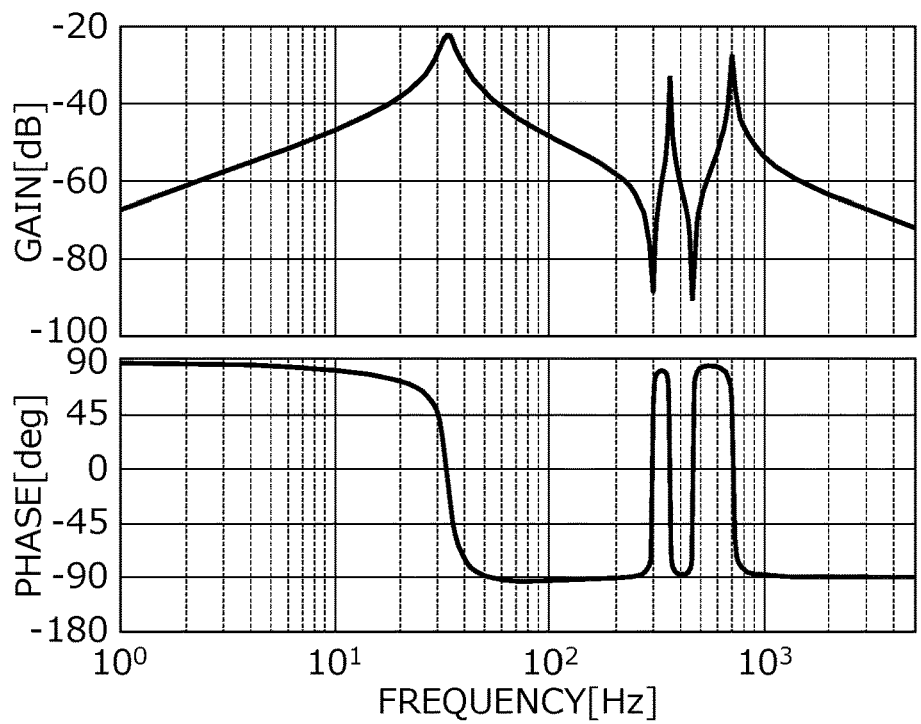
FIG. 4C is a Bode diagram of a transfer function Gw1d1.
Figure 4D:
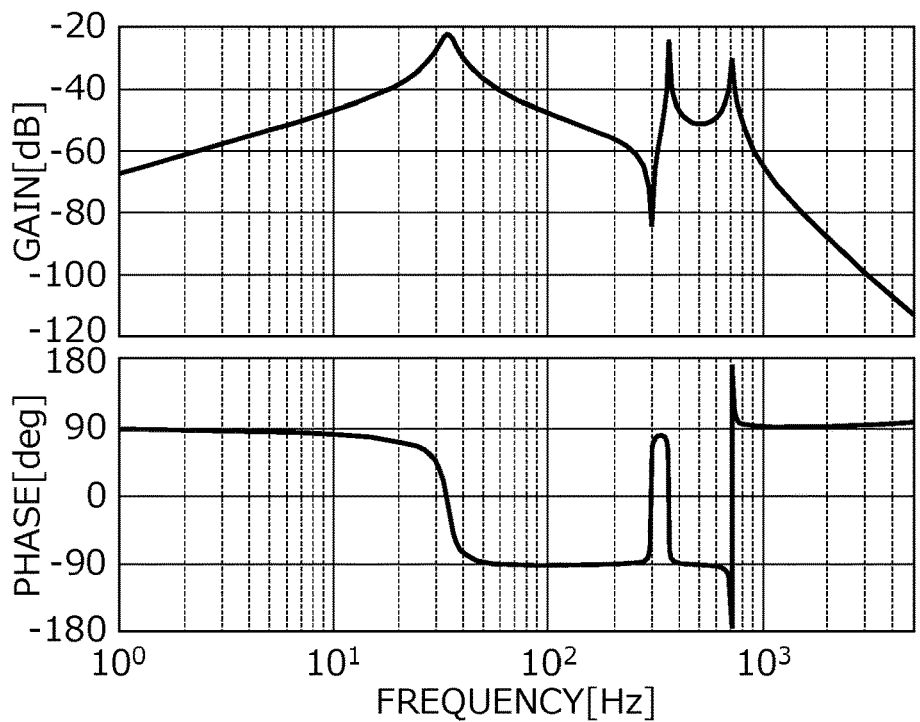
FIG. 4D is a Bode diagram of a transfer function Gw1d2.
Figure 4E:
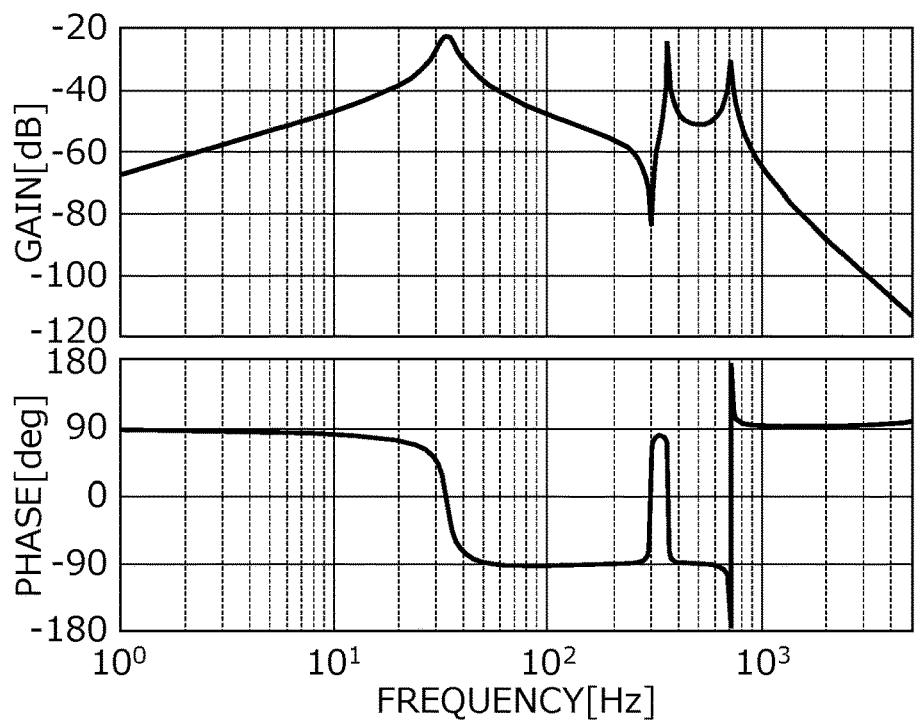
FIG. 4E is a Bode diagram of a transfer function Gw2d1.
Figure 4F:
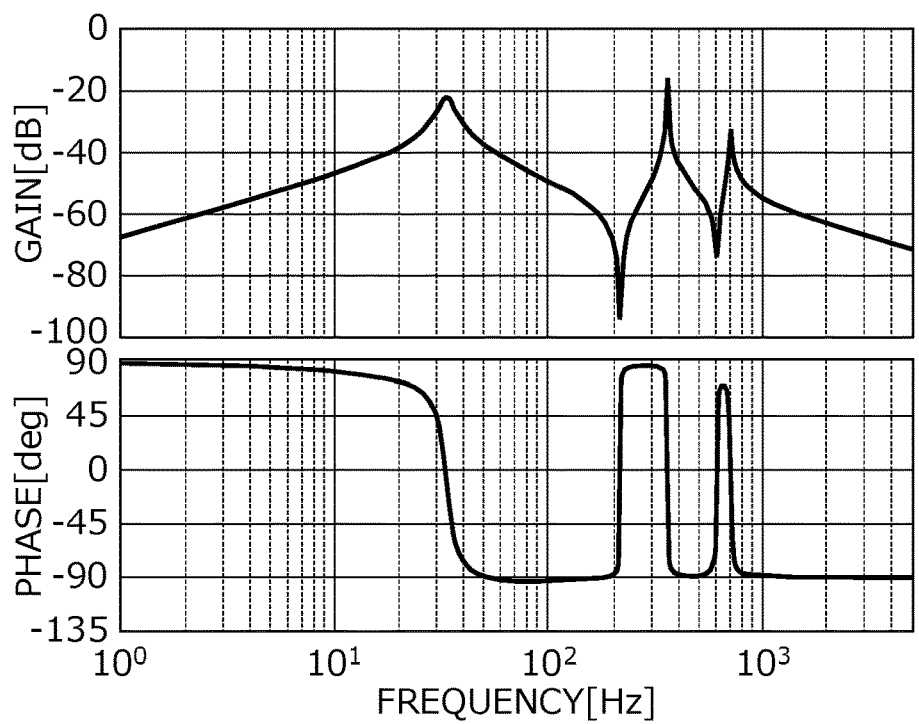
FIG. 4F is a Bode diagram of a transfer function Gw2d2.
Figure 4G:
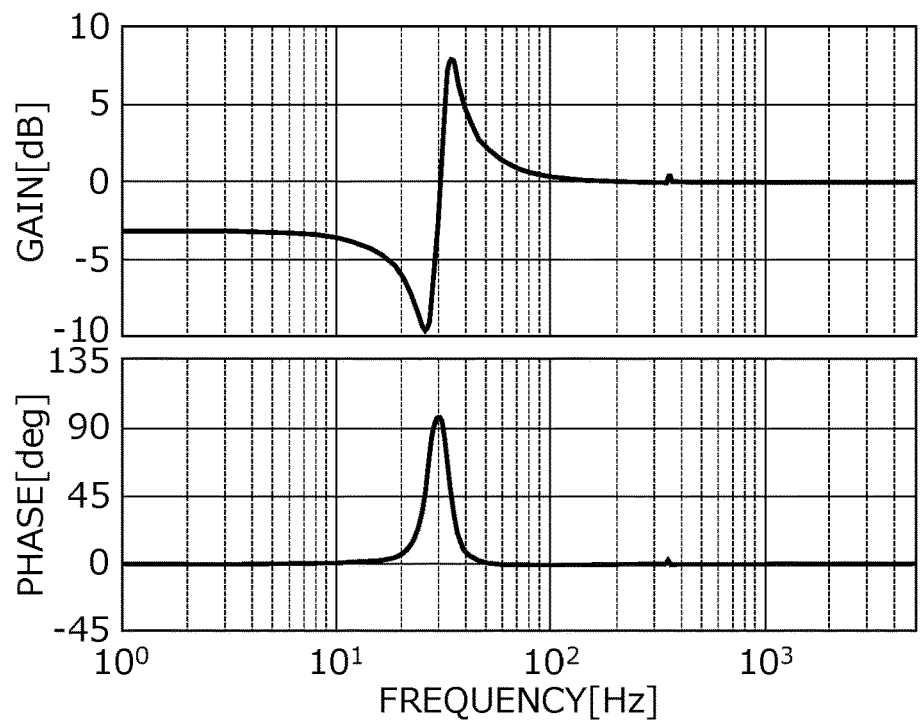
FIG. 4G is a Bode diagram of a transfer function Gi1d1.
Figure 4H:
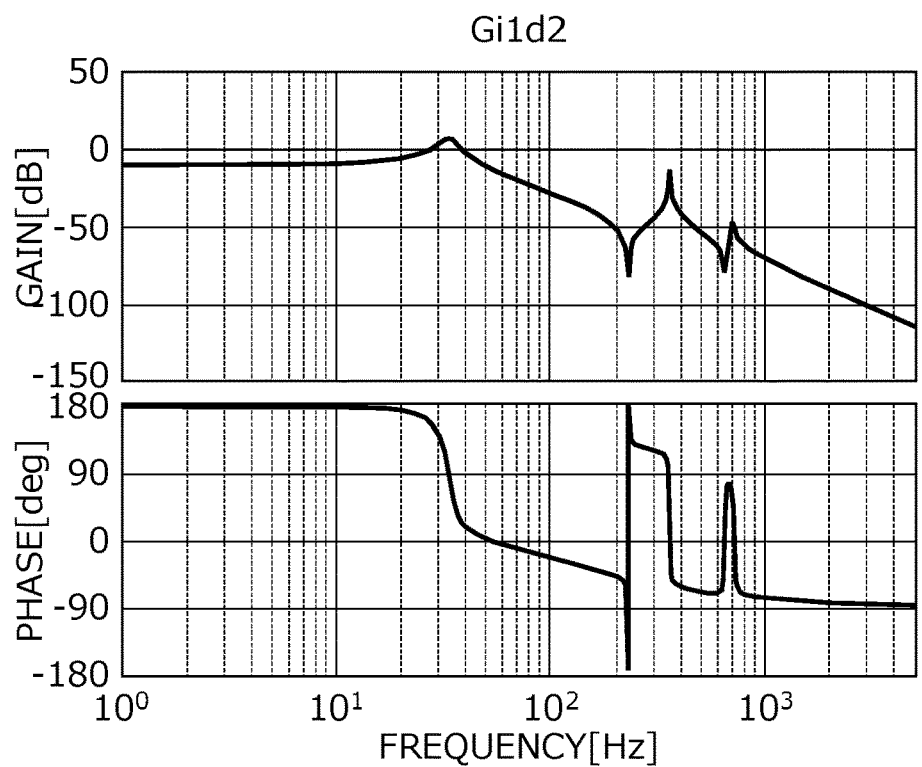
FIG. 4H is a Bode diagram of a transfer function Gi1d2.
Figure 4I:
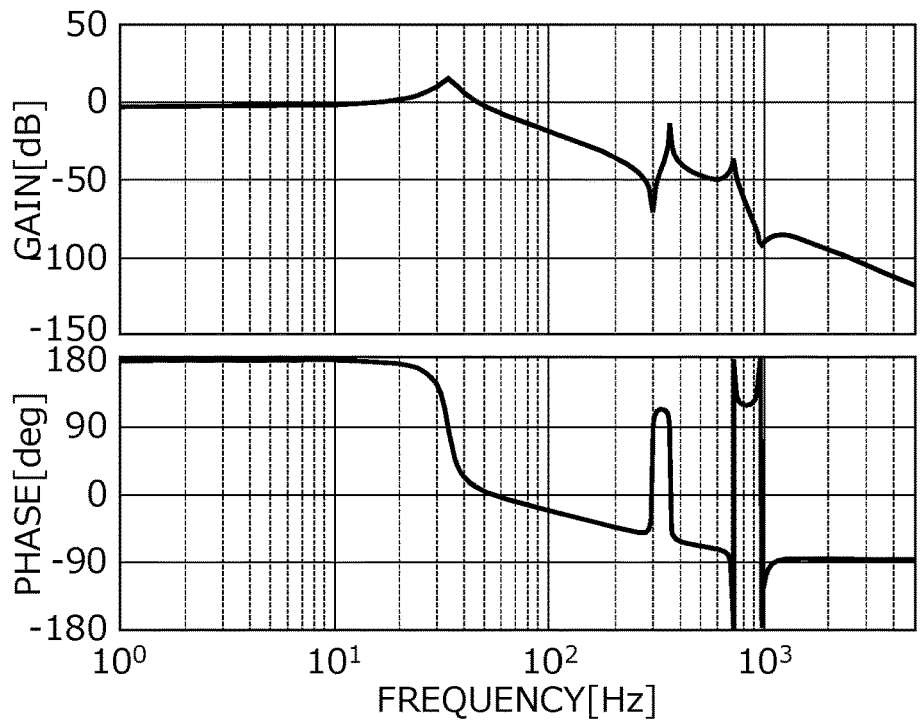
FIG. 4I is a Bode diagram of a transfer function Gi2d1.
Figure 4J:
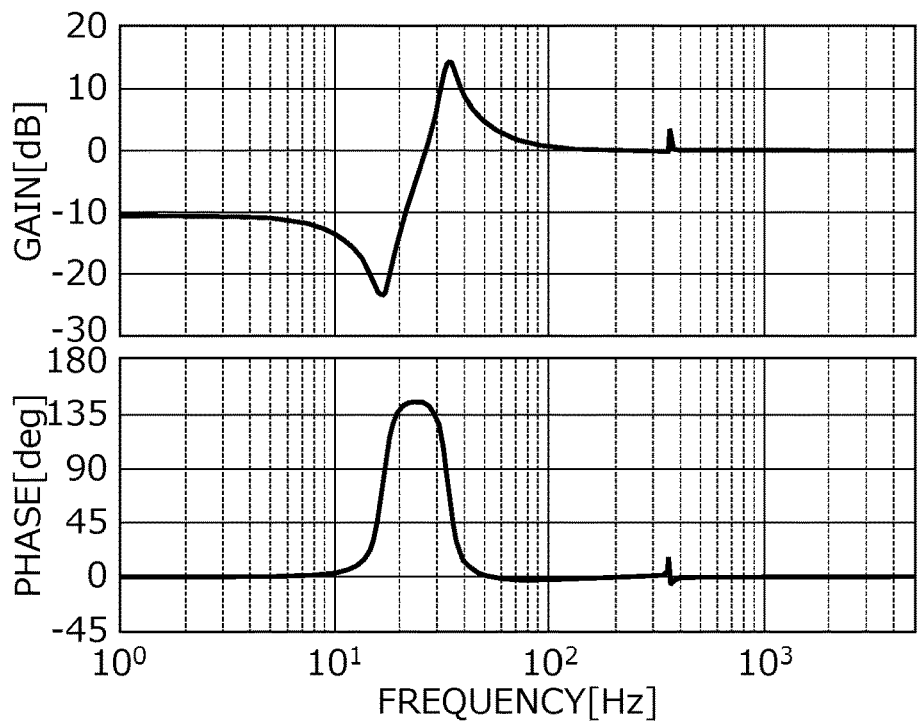
FIG. 4J is a Bode diagram of a transfer function Gi2d2.

FIGS. 4A to 4J are Bode diagrams of ten transfer functions measured in the first and second measurement steps, respectively. More specifically, FIG. 4A is a Bode diagram of the transfer function Gtd1; FIG. 4B is a Bode diagram of the transfer function Gtd2; FIG. 4C is a Bode diagram of the transfer function Gw1d1; FIG. 4D is a Bode diagram of the transfer function Gw1d2; FIG. 4E is a Bode diagram of the transfer function Gw2d1; FIG. 4G is a Bode diagram of the transfer function Gi1d1; FIG. 4H is a Bode diagram of the transfer function Gi1d2; FIG. 4I is a Bode diagram of the transfer function Gi2d1; and FIG. 4J is a Bode diagram of the transfer function Gi2d2.

Regarding the transfer functions obtained directly by excitation controlling either of two dynamometers, the dynamometer not under excitation control is under the control of the measurement control circuit 55. For this reason, with the ten transfer functions obtained directly in the first and second measurement steps, the characteristics of the rotation speed control circuit 56 of the measurement control circuit 55 are represented in the band of several 10 Hz, as shown in FIGS. 4A to 4J. In other words, the true mechanical characteristics not including the characteristics of the rotation speed control circuit 56 cannot be obtained directly.

Figure 5A:
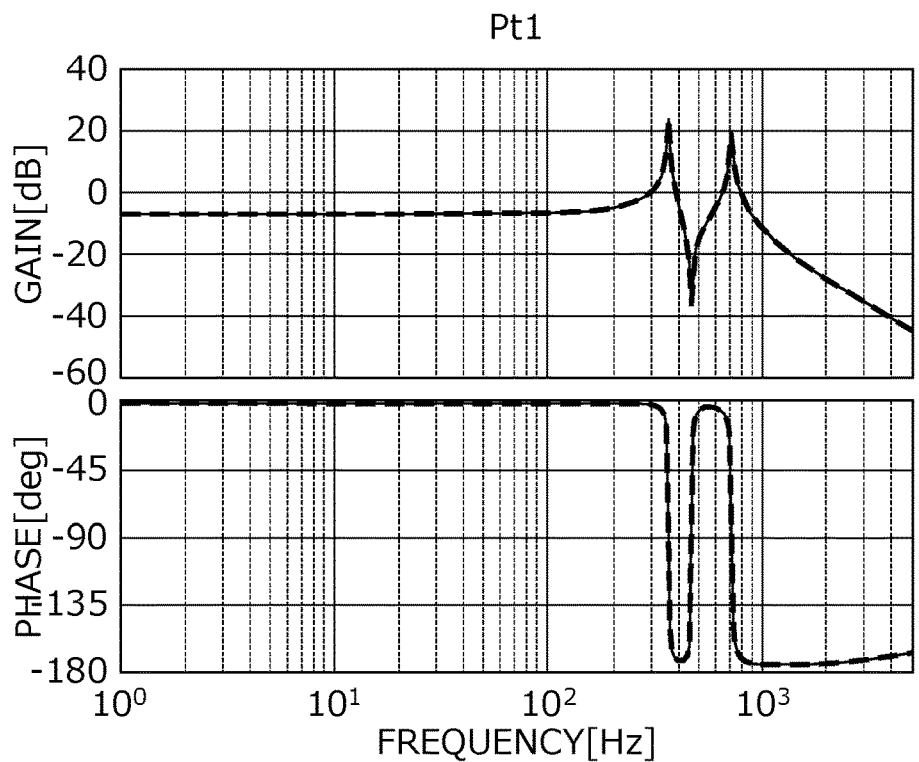
FIG. 5A is a Bode diagram of a mechanical characteristics transfer function Pt1.
Figure 5B:
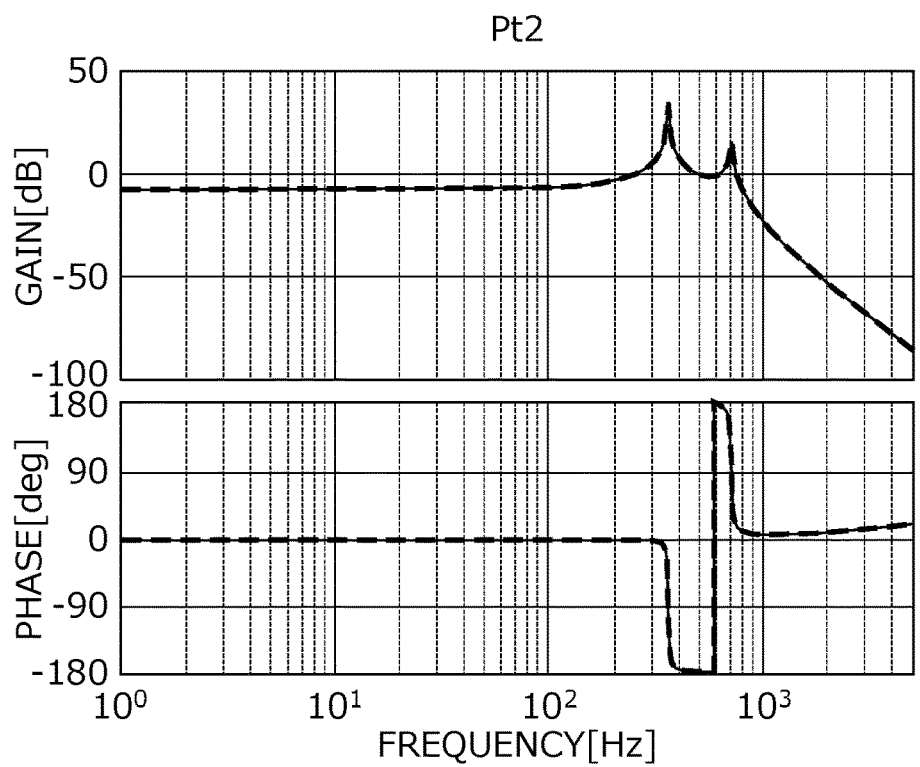
FIG. 5B is a Bode diagram of a mechanical characteristics transfer function Pt2.
Figure 5C:
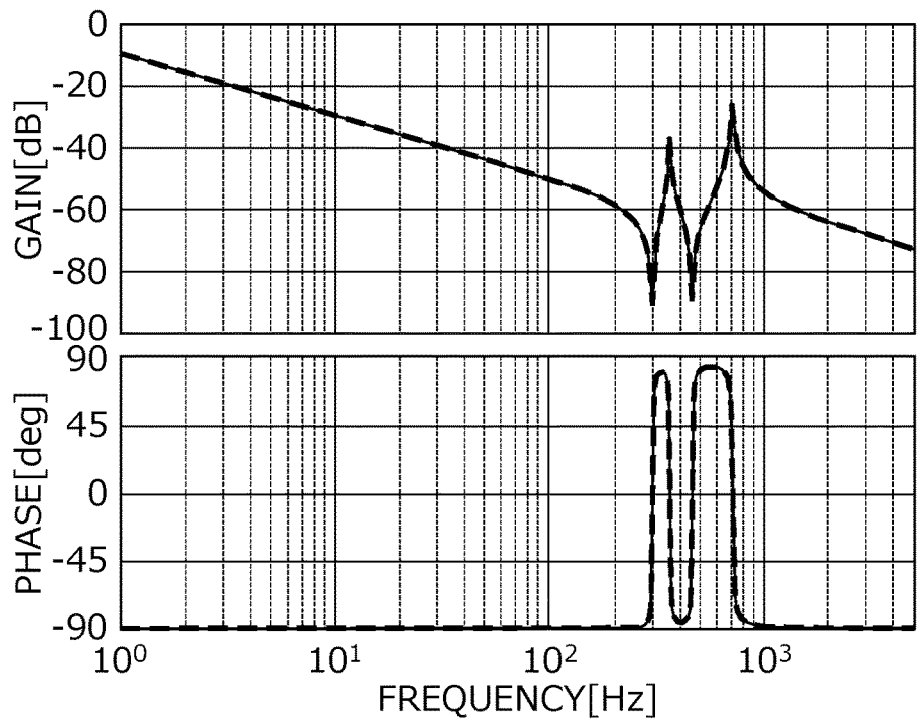
FIG. 5C is a Bode diagram of a mechanical characteristics transfer function Pw11.
Figure 5D:
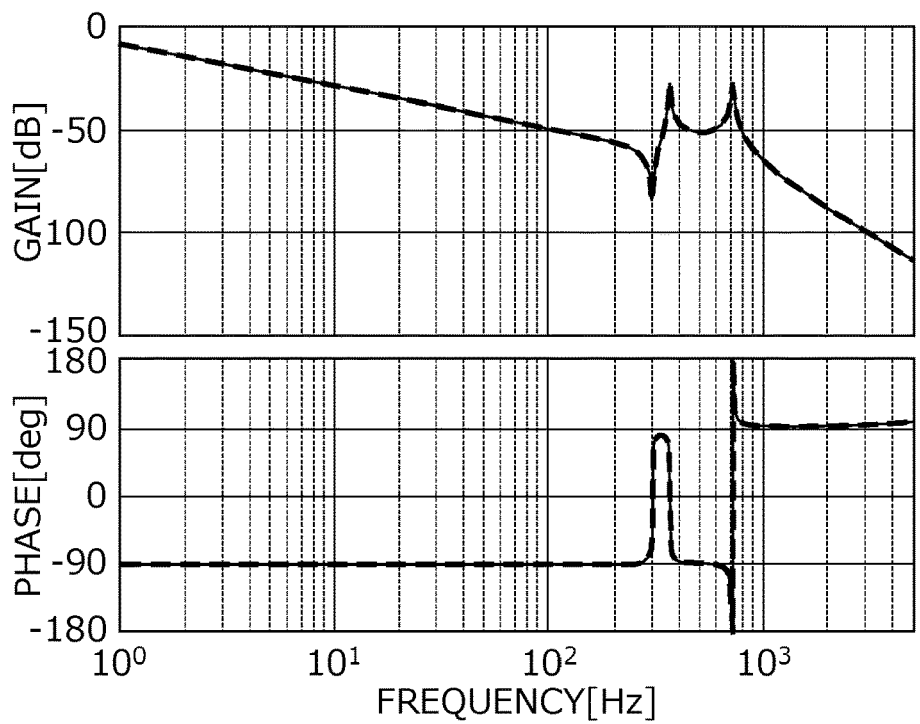
FIG. 5D is a Bode diagram of a mechanical characteristics transfer function Pw12.
Figure 5E:
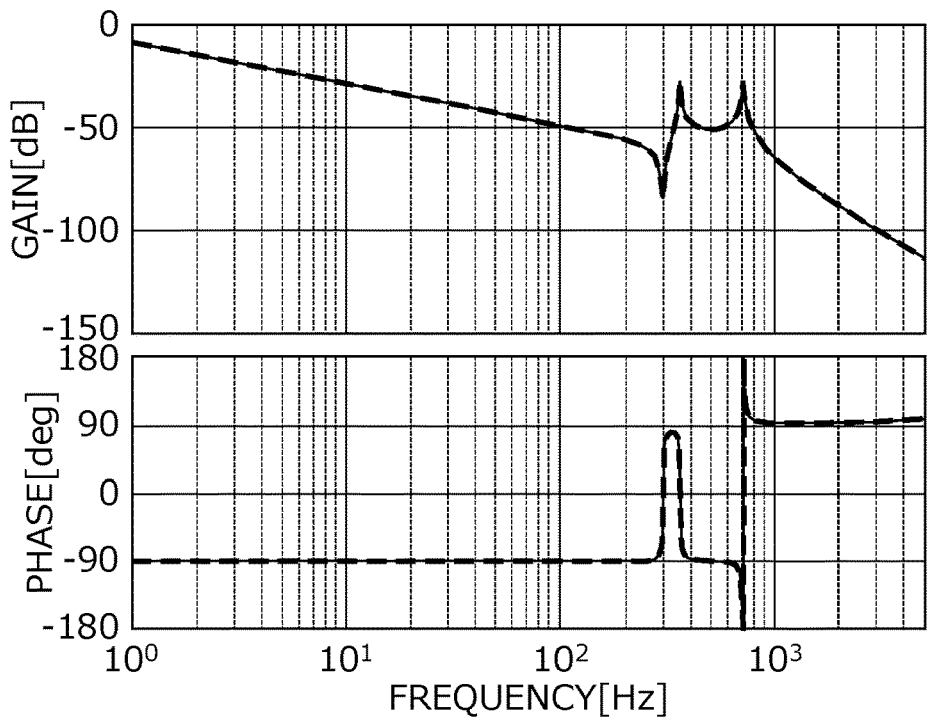
FIG. 5E is a Bode diagram of a mechanical characteristics transfer function Pw21.
Figure 5F:
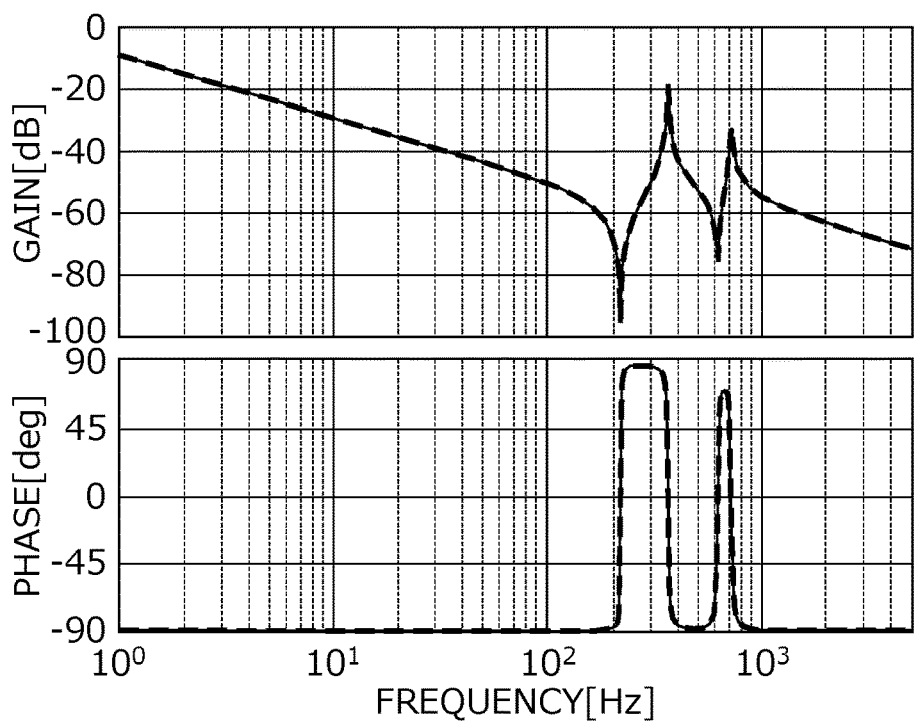
FIG. 5F is a Bode diagram of a mechanical characteristics transfer function Pw22.

FIGS. 5A to 5F are Bode diagrams of the six mechanical characteristic transfer functions estimated in the respective mechanical characteristic transfer function estimation step. More specifically, FIG. 5A is a Bode diagram of a mechanical characteristic transfer function Pt1; FIG. 5B is a Bode diagram of a mechanical characteristic transfer function Pt2; FIG. 5C is a Bode diagram of a mechanical characteristic transfer function Pw11; FIG. 5D is a Bode diagram of a mechanical characteristic transfer function Pw12; FIG. 5E is a Bode diagram of a mechanical characteristic transfer function Pw21; and FIG. 5F is a Bode diagram of a mechanical characteristic transfer function Pw22.

Figure 6A:
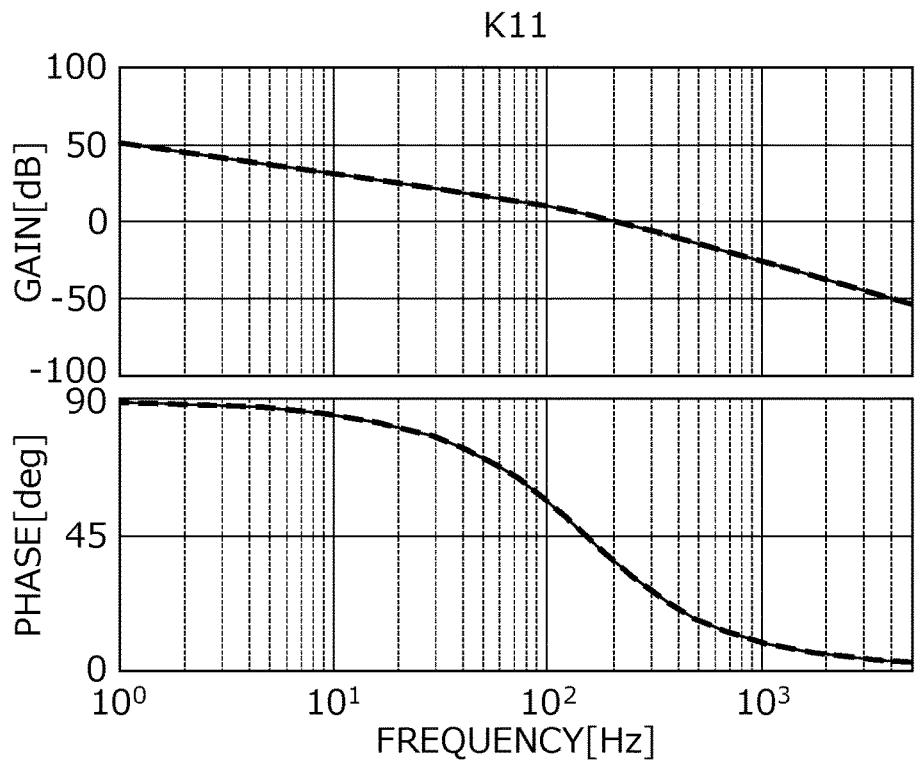
FIG. 6A is a Bode diagram of a control circuit transfer function K11.
Figure 6B:
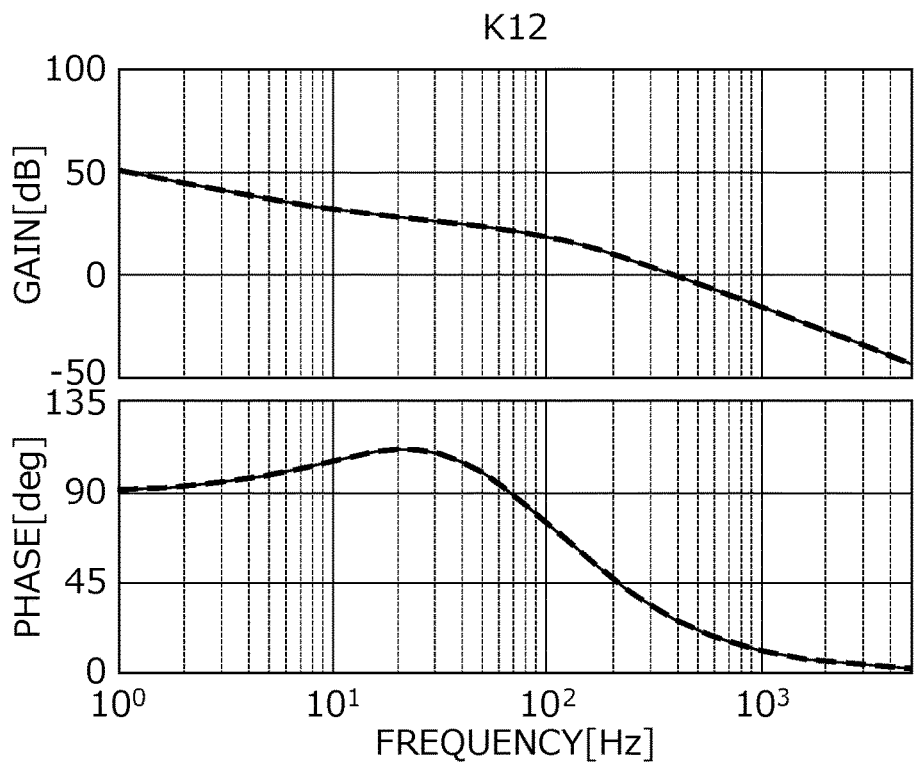
FIG. 6B is a Bode diagram of a control circuit transfer function K12.
Figure 6C:
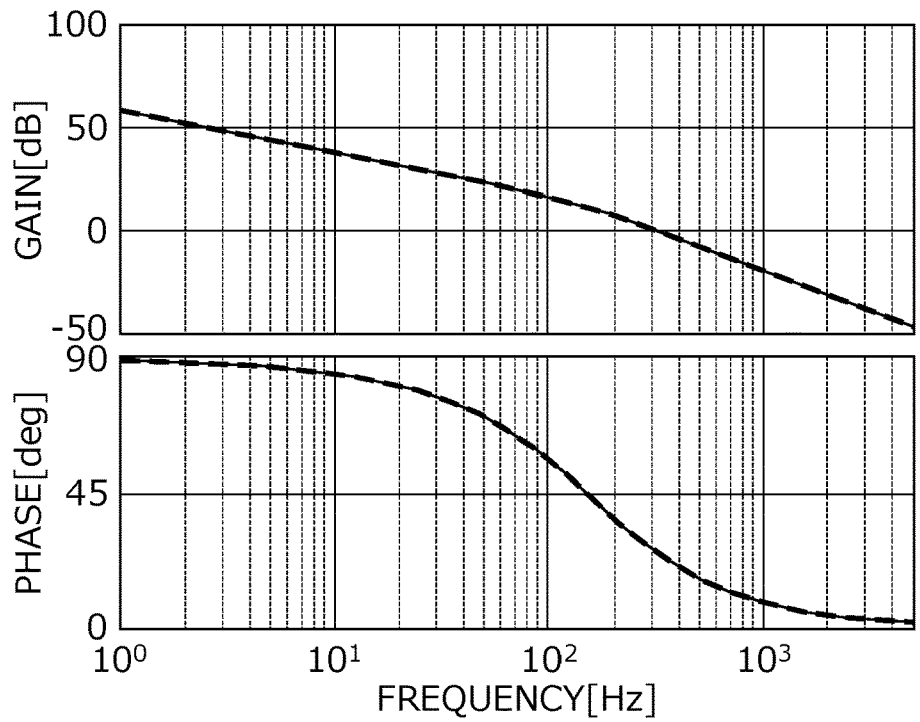
FIG. 6C is a Bode diagram of a control circuit transfer function K21.
Figure 6D:
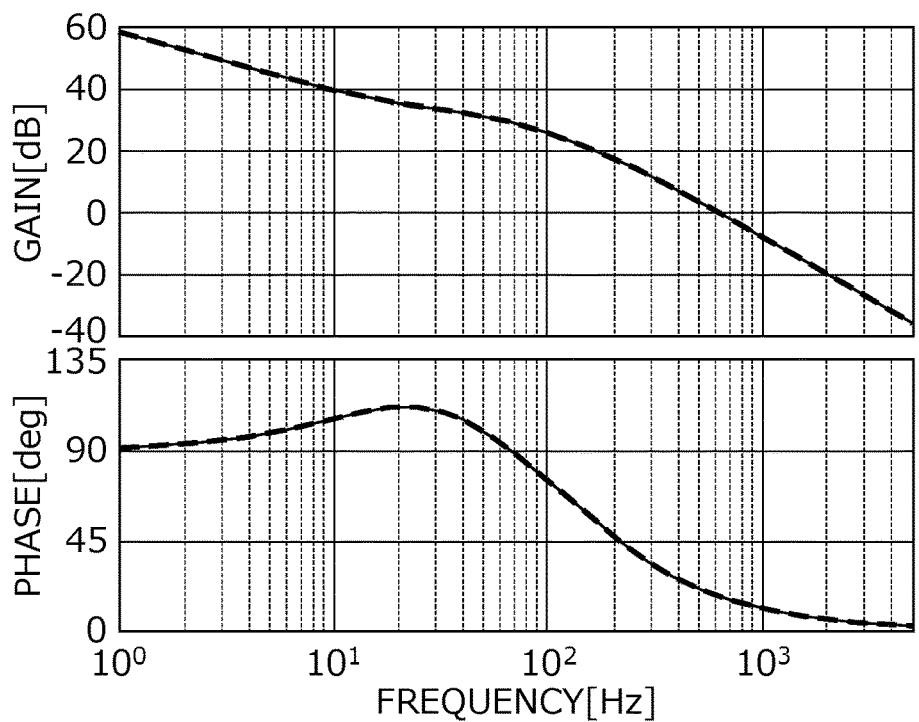
FIG. 6D is a Bode diagram of a control circuit transfer function K22.

FIGS. 6A to 6D are Bode diagrams of four control circuit transfer functions estimated in the respective control circuit characteristic estimation step. More specifically, FIG. 6A is a Bode diagram of the control circuit transfer function K11; FIG. 6B is a Bode diagram of the control circuit transfer function K12; FIG. 6C is a Bode diagram of the control circuit transfer function K21; and FIG. 6D is a Bode diagram of the control circuit transfer function K22.

It should be noted that, in FIGS. 5A to 5F and FIGS. 6A to 6D, the bold broken line indicates the true transfer function prepared for performing simulation, and the fine line indicates the transfer function estimated in the mechanical characteristic transfer function estimation step and control circuit characteristic estimation step. As shown in FIGS. 5A to 5F, the fine line and bold broken line are almost equal. Therefore, according to the mechanical characteristics estimation method and mechanical characteristics estimation device of the present embodiment, it was clarified that it is possible to estimate the true mechanical characteristic transfer function removing the control characteristics of the measurement control circuit 55. In addition, as shown in FIGS. 6A to 6D, the fine solid line and bold broken line are almost equal. Therefore, according to the mechanical characteristics estimation method and mechanical characteristics estimation device of the present embodiment, only the measurement control circuit 55 is retrieved from the drive train bench system 1, and it was clarified that it is possible to easily estimate the characteristic of the measurement control circuit 55 using the results of the first and second measurement steps used upon estimating the mechanical characteristic transfer function, without performing identity testing using only this measurement control circuit 55.

Although an embodiment of the present invention has been explained above, the present invention is not to be limited thereto. The configurations of the particulars may be appropriately modified within the scope of the gist of the preset invention. For example, in the above embodiment, a case of applying the mechanical characteristics estimation method and mechanical characteristics estimation device of the present invention to the drive train bench system 1 has been explained; however, the application target of the present invention is not limited to a drive train bench system. The present invention can be applied to any system so long as being a test system including a tandem dynamometer unit configured by coupling two dynamometers in series.

EXPLANATION OF REFERENCE NUMERALS

1 drive train bench system (test system)
W test piece
W1 input shaft
21 first dynamometer (first electric motor)
21a first drive shaft
22 second dynamometer (second electric motor)
22a second drive shaft
3 shaft torque sensor
41 first rotation speed detector
42 second rotation speed detector
51 dynamometer control device
55 measurement control circuit (control device)
9 arithmetic unit (mechanical characteristic estimation device, first measurement means, second measurement means, mechanical characteristic estimation means)

The invention claimed is:

1. A mechanical characteristics estimation method for estimating mechanical characteristics of a test system that includes: a first electric motor having a first drive shaft coupled coaxially with an input shaft of a test piece, and causing the first drive shaft to rotate in response to a first input; a second electric motor having a second drive shaft coupled coaxially with the first drive shaft and causing the second drive shaft to rotate in response to a second input; a shaft torque sensor which couples the input shaft and the first drive shaft and generates a shaft torque detection signal according to shaft torque; a first speed detector which generates a first speed detection signal according to a rotation speed of the first drive shaft; a second speed detector which generates a second speed detection signal according to a rotation speed of the second drive shaft; a control device which generates the first input and the second input based on the first speed detection signal and the second speed detection signal; and a generator which generates a first excitation signal and a second excitation signal, the mechanical characteristic estimation method comprising:
measuring a response to the first excitation signal when superimposing the first excitation signal on the first input without superimposing the second excitation signal on the second input, in a state in which the first electric motor and the second electric motor are controlled by the control device;
measuring a response to the second excitation signal when superimposing the second excitation signal on the second input without superimposing the first excitation signal on the first input, in a state in which the first electric motor and the second electric motor are controlled by the control device; and
estimating the mechanical characteristic of a portion of the test system other than the test piece using the responses to the first and second excitation signal.

2. The mechanical characteristics estimation method of a test system according to claim 1, wherein the estimating the mechanical characteristic includes estimating at least any of a transfer function of the shaft torque detection signal relative to the first input; a transfer function of the shaft torque detection signal relative to the second input; a transfer function of the first speed detection signal relative to the first input; a transfer function of the first speed detection signal relative to the second input; a transfer function of the second detection signal relative to the first input; and a transfer function of the second speed detection signal relative to the second input.

3. The mechanical characteristics estimation method of a test system according to claim 1, wherein the measuring the response to the first excitation signal includes measuring a transfer function of the shaft torque detection signal relative to the first excitation signal; a transfer function of the first speed detection signal relative to the first excitation signal; a transfer function of the second speed detection signal relative to the first excitation signal; a transfer function of the first input relative to the first excitation signal; and a transfer function of the second input relative to the first excitation signal.

4. The mechanical characteristics estimation method of a test system according to claim 1, wherein the measuring the response to the second excitation signal includes measuring a transfer function of the shaft torque detection signal relative to the second excitation signal; a transfer function of the first speed detection signal relative to the second excitation signal; a transfer function of the second speed detection signal relative to the second excitation signal; a transfer function of the first input relative to the second excitation signal; and a transfer function of the second input relative to the second excitation signal.

5. The mechanical characteristics estimation method of a test system according to claim 1, further comprising:
estimating a control circuit characteristic of the control device using the responses to the first and second excitation signal.

6. The mechanical characteristics estimation method of a test system according to claim 5, wherein the estimating the control circuit characteristic includes estimating at least any of a transfer function of the first input relative to the first speed detection signal; a transfer function of the first input relative to the second speed detection signal; a transfer function of the second input relative to the first speed detection signal; a transfer function of the second input relative to the first speed detection signal; and a transfer function of the second input relative to the second speed detection signal.

7. A mechanical characteristics estimation device for estimating mechanical characteristics of a test system that includes: a first electric motor having a first drive shaft coupled coaxially with an input shaft of a test piece, and causing the first drive shaft to rotate in response to a first input; a second electric motor having a second drive shaft coupled coaxially with the first drive shaft and causing the second drive shaft to rotate in response to a second input; a shaft torque sensor which couples the input shaft and the first drive shaft and generates a shaft torque detection signal according to shaft torque; a first speed detector which generates a first speed detection signal according to a rotation speed of the first drive shaft; a second speed detector which generates a second speed detection signal according to a rotation speed of the second drive shaft; a control device which generates the first input and the second input based on the first speed detection signal and the second speed detection signal; and a generator which generates a first excitation signal and a second excitation signal, the mechanical characteristics estimation device comprising:
a first measurement unit configured to measure a response to the first excitation signal when superimposing the first excitation signal on the first input without superimposing the second excitation signal on the second input, in a state in which the first electric motor and the second electric motor are controlled by the control device;
a second measurement unit configured to measure a response to the second excitation signal when superimposing the second excitation signal on the second input without superimposing the first excitation signal on the first input, in a state in which the first electric motor and the second electric motor are controlled by the control device; and
a mechanical characteristics estimation unit configured to estimate the mechanical characteristics of a portion of the test system other than the test piece using results measured by the first measurement means and the second measurement means.

8. The mechanical characteristics estimation method of a test system according to claim 2, wherein the measuring the response to the first excitation signal includes measuring a transfer function of the shaft torque detection signal relative to the first excitation signal; a transfer function of the first speed detection signal relative to the first excitation signal; a transfer function of the second speed detection signal relative to the first excitation signal; a transfer function of the first input relative to the first excitation signal; and a transfer function of the second input relative to the first excitation signal.

9. The mechanical characteristics estimation method of a test system according to claim 2, wherein the measuring the response to the second excitation signal includes measuring a transfer function of the shaft torque detection signal relative to the second excitation signal; a transfer function of the first speed detection signal relative to the second excitation signal; a transfer function of the second speed detection signal relative to the second excitation signal; a transfer function of the first input relative to the second excitation signal; and a transfer function of the second input relative to the second excitation signal.

10. The mechanical characteristics estimation method of a test system according to claim 2, further comprising:
estimating a control circuit characteristic of the control device using the responses to the first and second excitation signal.

11. The mechanical characteristics estimation method of a test system according to claim 10, wherein the estimating the control circuit characteristic includes estimating at least any of a transfer function of the first input relative to the first speed detection signal; a transfer function of the first input relative to the second speed detection signal; a transfer function of the second input relative to the first speed detection signal; a transfer function of the second input relative to the first speed detection signal; and a transfer function of the second input relative to the second speed detection signal.

12. The mechanical characteristics estimation method of a test system according to claim 3, wherein the measuring the response to the second excitation signal includes measuring a transfer function of the shaft torque detection signal relative to the second excitation signal; a transfer function of the first speed detection signal relative to the second excitation signal; a transfer function of the second speed detection signal relative to the second excitation signal; a transfer function of the first input relative to the second excitation signal; and a transfer function of the second input relative to the second excitation signal.

13. The mechanical characteristics estimation method of a test system according to claim 3, further comprising:

estimating a control circuit characteristic of the control device using the responses to the first and second excitation signal.

14. The mechanical characteristics estimation method of a test system according to claim 13, wherein the estimating the control circuit characteristic includes estimating at least any of a transfer function of the first input relative to the first speed detection signal; a transfer function of the first input relative to the second speed detection signal; a transfer function of the second input relative to the first speed detection signal; a transfer function of the second input relative to the first speed detection signal; and a transfer function of the second input relative to the second speed detection signal.

15. The mechanical characteristics estimation method of a test system according to claim 4, further comprising:
estimating a control circuit characteristic of the control device using the responses to the first and second excitation signal.

16. The mechanical characteristics estimation method of a test system according to claim 15, wherein the estimating the control circuit characteristic includes estimating at least any of a transfer function of the first input relative to the first speed detection signal; a transfer function of the first input relative to the second speed detection signal; a transfer function of the second input relative to the first speed detection signal; a transfer function of the second input relative to the first speed detection signal; and a transfer function of the second input relative to the second speed detection signal.

17. The mechanical characteristics estimation method of a test system according to claim 8, wherein the measuring the response to the second excitation signal includes measuring a transfer function of the shaft torque detection signal relative to the second excitation signal; a transfer function of the first speed detection signal relative to the second excitation signal; a transfer function of the second speed detection signal relative to the second excitation signal; a transfer function of the first input relative to the second excitation signal; and a transfer function of the second input relative to the second excitation signal.

18. The mechanical characteristics estimation method of a test system according to claim 17, further comprising:
estimating a control circuit characteristic of the control device using the responses to the first and second excitation signal.

19. The mechanical characteristics estimation method of a test system according to claim 18, wherein the estimating the control circuit characteristic includes estimating at least any of a transfer function of the first input relative to the first speed detection signal; a transfer function of the first input relative to the second speed detection signal; a transfer function of the second input relative to the first speed detection signal; a transfer function of the second input relative to the first speed detection signal; and a transfer function of the second input relative to the second speed detection signal.

20. The mechanical characteristics estimation method of a test system according to claim 12, further comprising:
estimating a control circuit characteristic of the control device using the responses to the first and second excitation signal.

* * * * *